Feb. 26, 1946.   A. SVOBODA   2,395,768
SPRING DEVICE
Filed July 1. 1943   5 Sheets-Sheet 1

INVENTOR.
Antonin Svoboda
BY
Byerly Watson & Simonds
ATTORNEYS

Feb. 26, 1946. A. SVOBODA 2,395,768
SPRING DEVICE
Filed July 1, 1943   5 Sheets-Sheet 2
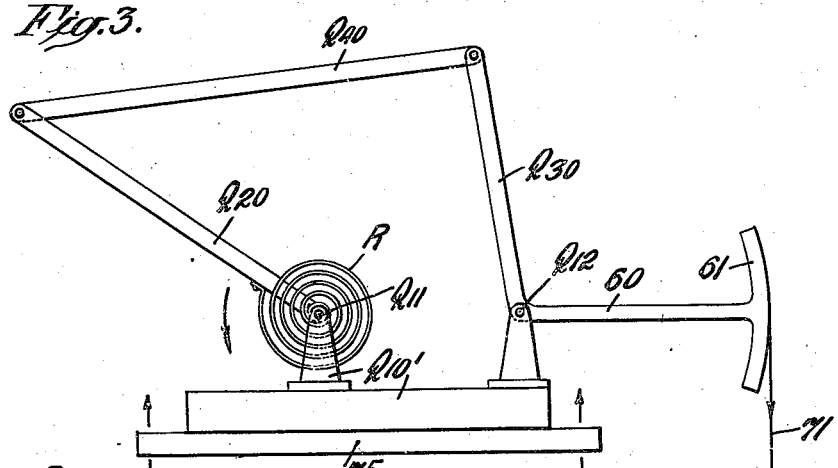
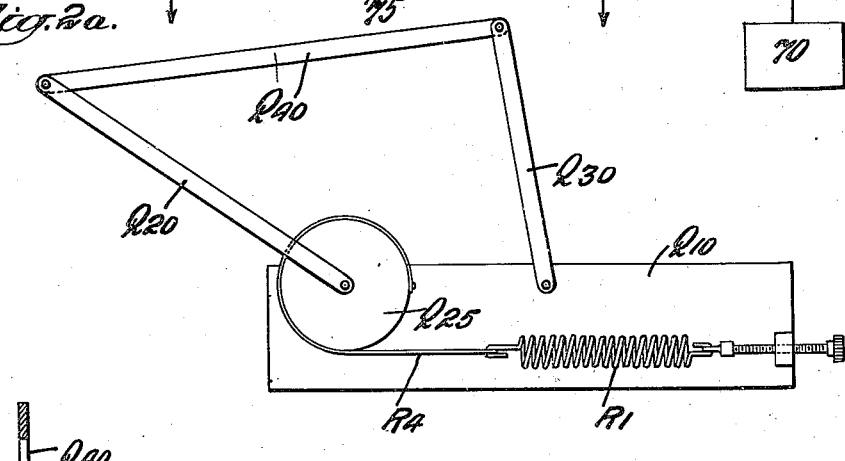
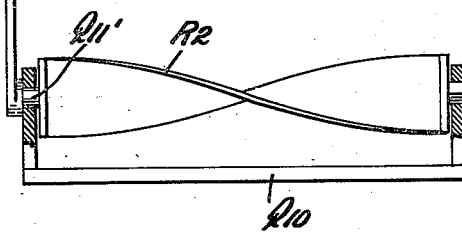
INVENTOR.
Antonin Svoboda
BY
Byerly, Watson & Simonds
ATTORNEYS

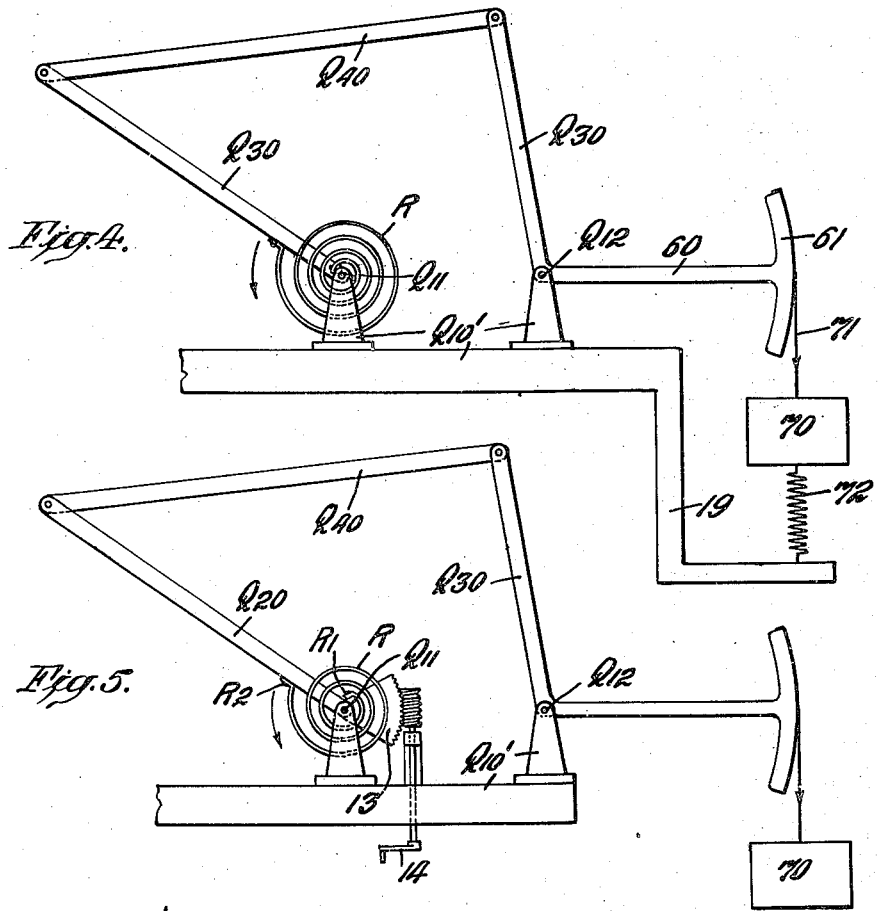
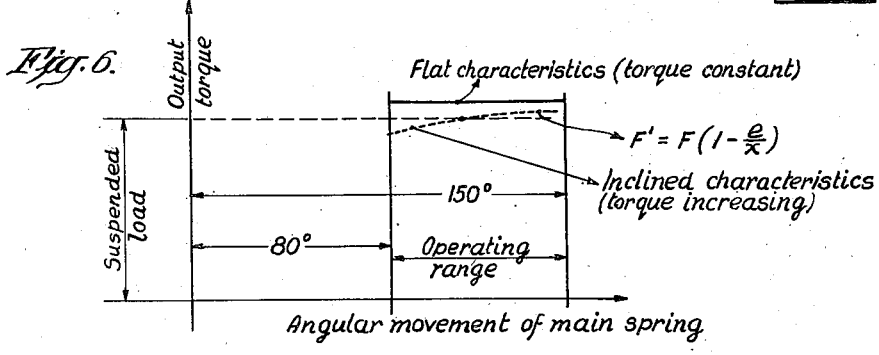

Feb. 26, 1946.  A. SVOBODA  2,395,768
SPRING DEVICE
Filed July 1, 1943   5 Sheets-Sheet 4
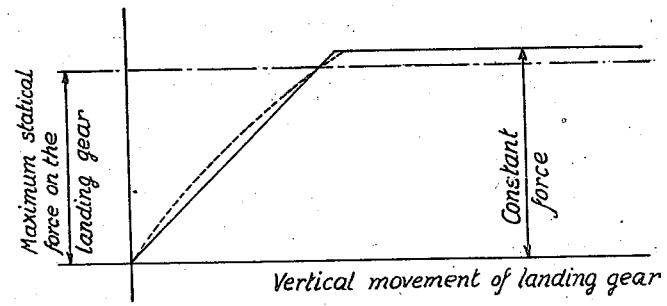
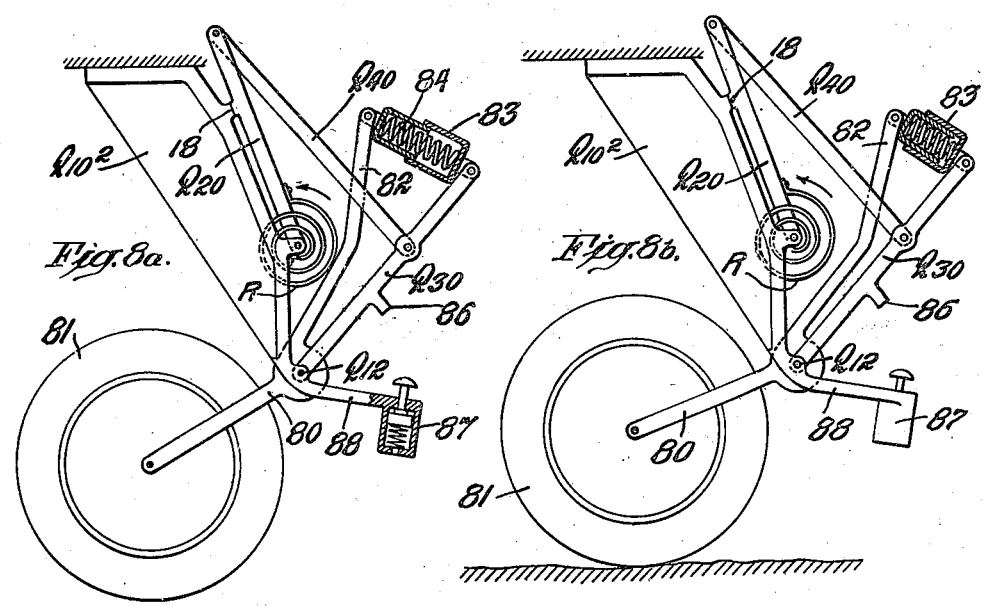
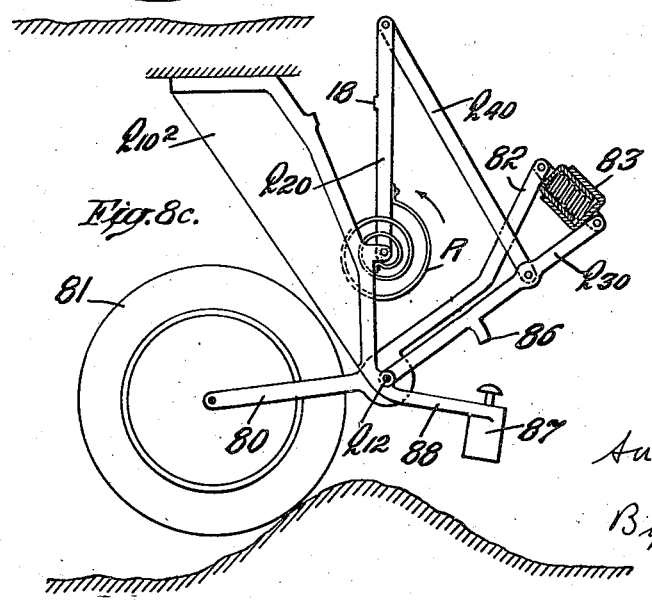
INVENTOR.
Antonin Svoboda
BY
Byerly, Watson & Simonds
ATTORNEYS Feb. 26, 1946.   A. SVOBODA   2,395,768
SPRING DEVICE
Filed July 1, 1943   5 Sheets-Sheet 5

INVENTOR.
Antonin Svoboda
BY
Byerly, Watson & Limonds
ATTORNEYS

Patented Feb. 26, 1946

2,395,768

UNITED STATES PATENT OFFICE 2,395,768

SPRING DEVICE

Antonin Svoboda, Forest Hills, N. Y.

Application July 1, 1943, Serial No. 493,153

2 Claims. (Cl. 267—1)

This invention provides a spring device which applies a constant force over a substantial range of movement, or a force varying in accordance with the predetermined law different from the characteristic of the spring.

When any member which is resilient or elastic (which terms are herein used synonymously) is forcibly deformed from its normal or free condition to a stressed condition within its elastic limit, it exerts a force whose value depends upon the extent of the deformation. The relation between the force exerted by any resilient member and the extent of deformation of the member is termed "the force-deformation characteristic" of the member, and may be represented by the formula:

$$F = f(d)$$

where $F$ is the force and $d$ the deformation of the spring. In the case of ordinary springs, including both metal springs and pneumatic springs, $F$ is ordinarily a linear quantity indicating the force in pounds or other convenient unit exerted by the spring in the direction in which the spring is designed to act, and $d$ is also a linear quantity, measured either in distance units or in angular units, indicating the distance which the working end of the spring has been moved from the position which it would occupy in the normal or free position of the spring. So measured, the force-deformation characteristic of most springs over their working range is, at least approximately, $$F = K \cdot d$$

where $K$ is constant, that is to say, the force applied by the spring ordinarily increases in direct proportion to the extent of deformation and is, therefore, a variable depending upon the position of the working end of the spring.

Before my invention, there was not available, so far as I am aware, any spring device for exerting a constant force over a substantial working range. Such a device is achieved in accordance with my invention by combining a resilient member with a substantially frictionless force-transmitting linkage all the parts of which have such critical relative dimensions that the relation between the movements of the input and output elements of the linkage counterbalances the variation in the force applied by the resilient member, so as to produce a constant force at the output element of the linkage.

My invention contemplates also a spring device including a spring and a substantially frictionless linkage in which the force at the output element of the linkage varies in accordance with a desired predetermined law differing from the force-deformation characteristic of the spring.

In order that my invention may clearly be understood, I will describe the specific embodiments of it which are shown in the accompanying drawings, in which:

Fig. 2a is a side view of a similar device in which a tension spring is substituted for the spiral spring of Fig. 1; Fig. 2b is a transverse section of a modified device similar to that shown in Fig. 1 in which a flat torsion spring is substituted for the spiral spring shown in Fig. 1;

Fig. 3 is a diagrammatic side elevation of apparatus for eliminating vibration;

Figs. 4 and 5 are similar views of modified apparatus similar to that shown in Fig. 3;

Fig. 6 is a graph for explaining the operation of the apparatus shown in Fig. 5;

Fig. 7 is a graph for explaining the application of the spring device to a landing gear;

Figs. 8a, 8b and 8c are diagrammatic side elevatons showing different positions of a landing gear including the spring device; Fig. 9a is a transverse section on the axis of the quadratic arm of the linkage, and Fig. 9b is a face view.

Fig. 1 shows a spring device embodying my invention and consisting of the combination of a resilient member and a linkage.

The linkage Q shown in Fig. 1 constitutes an important part of my invention and is based upon my discovery that a movement bearing a quadratic relation to another movement may be obtained over a substantial range by means of a very simple linkage consisting of two pivoted arms connected by a bar, in which all parts of the linkage have the critical relative dimensions hereinafter specified.

Figure 1:
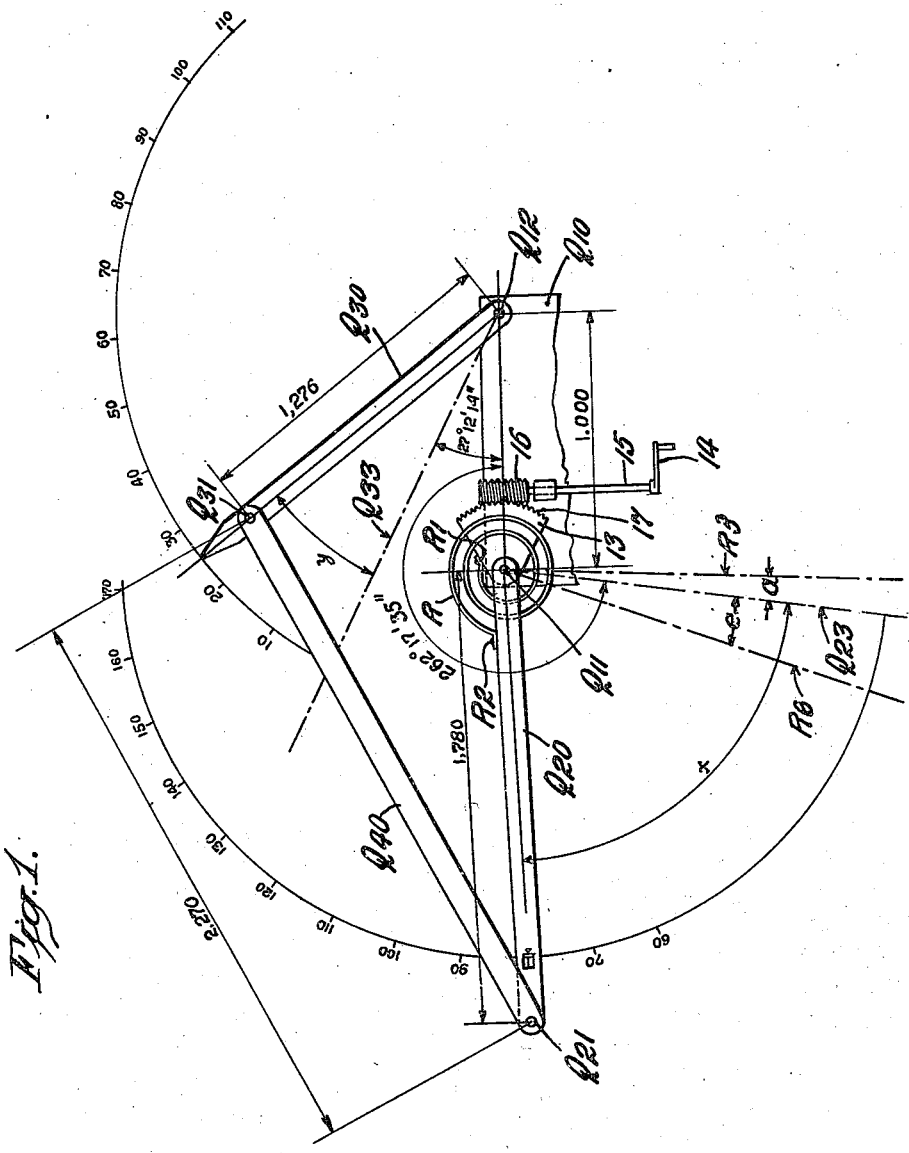
Fig. 1 is a partly diagrammatic view of a spring device embodying my invention and including a quadratic linkage and a spiral spring.

The linkage shown in Fig. 1 consists of arms Q20, Q30 pivoted at spaced points Q11, Q12 on a support Q10 which constitutes the frame or base of the linkage. The arms Q20 and Q30 are connected by a bar Q40 which is pivoted to them at points Q21, Q31 located at different distances from the points on which the bars are pivoted. All the pivots have their axes parallel so that all moving parts of the linkage lie in the same plane or in parallel planes.

The critical relative dimensions of the parts of the linkage are indicated in Fig. 1 and are the lengths of the members Q10, Q20, Q30, Q40 measured between pivot points. They are as follows:

Length of frame Q10 (Q11–Q12) .......... 1.000
Length of longer arm Q20 (Q11–Q21) .... 1.780
Length of shorter arm Q30 (Q12–Q31) ... 1.276
Length of connecting bar Q40 (Q21–Q31) . 2.270

As it is the relationship between the dimensions which is critical, the length of the frame Q10 between the pivot points Q11 and Q12 has, for convenience, been taken as unity so that the figures set opposite the lengths of the other parts express the relation between these lengths and the length of the frame Q10.

As a result of the critical relationships, movements of the arm Q20 and Q30 bear a predetermined relationship to another. This relationship is quadratic and may be represented by the formula:

$$y = C \cdot x^2 \qquad (1)$$

where $y$ is the angular distance of the arm Q30 (which I term the "quadratic element") from a fixed zero line Q33 lying at an angle of 27°12′14″ to the line Q11–Q12 of the base Q10, $x$ is the angular distance of the arm Q20 (which I term the "linear element") from a fixed zero line Q23 lying at an angle of 262°17′35″ from the line Q11–Q12 of the base Q10, and C is a constant whose value is 1/256 if $x$ and $y$ are measured in degrees, or 0.2238 if $x$ and $y$ are measured in radians.

The quadratic relationship between the positions of the two arms holds with great exactness over the range of 80° to 150° for the arm Q20. Within this range, the position of the quadratic arm Q30 is always within plus or minus 40″, or less than one-tenth of one per cent., of the position given by the above formula. The range may be extended from 60° to 170° for the arm Q20 without introducing errors greater than 3′ and these do not seriously affect the operation of the linkage when used as part of my spring device.

To illustrate, and permit verification of, the quadratic relationship, pointers and scales for the two arms graduated in degrees from their respective zero lines are shown in Fig. 1. These scales do not form part of the linkage mechanism.

To save needless repetition, I shall refer to the linkage which has been described as a "quadratic linkage," defining this term to mean a linkage having two connected elements whose movements measured from fixed zero lines bear an approximately quadratic relationship to each other over a substantial range; and I shall distinguish the two elements as the "linear" and "quadratic" elements of the linkage.

The resilient member R of the device shown in Fig. 1 has the form of a spiral spring exerting a torque around the pivot Q11 of the arm Q20, the linear element of the linkage. One end R1 of the spring R is anchored to the frame or support Q10 of the linkage. For reasons hereinafter explained, this end of the spring is mounted so that its position may be adjusted angularly about the pivot Q11. For this purpose, this end of the spring is attached to a sector 13 pivoted on the frame Q10 at Q11 and adjustable about its pivot by means of a crank 14 and a shaft 15 which is journalled on the frame Q10 and carries a worm 16 engaging gear teeth 17 on the periphery of the sector 13.

The other end R2 of the spring R is attached to the arm Q20. When the spring is stressed, the spring exerts a torque on the arm Q20 tending to move it counterclockwise. The position of the end R1 of the spring is such that the spring would be free or unstressed if the arm Q20 lay along the zero line Q23 referred to in the description of the linkage.

The working range of the spring lies between the position in which the arm Q20 is at 60° to the line Q23 and the position in which it is at 170° to the line Q23. Over this working range, the force-deformation characteristic of the spring is $$F = K \cdot d \qquad (2)$$

where F is the angular force or torque exerted on the arm Q20, $d$ is the angular distance between the line Q33 and the position of the arm Q20, and K is a constant. In other words, the torque of the spring is directly proportional to the angular deformation of the spring from its free position, as is usually the case with springs of this character.

The linkage exactly counterbalances the force-deformation characteristic of the spring so that the angular force or torque which the spring through the linkage applies to the quadratic element of the linkage, the output arm Q30, is substantially constant throughout the working range of the spring, and is accurately constant throughout the range of 80° to 150° for the arm Q20. The reason for this will be explained:

Since the spring is in free or unstressed condition when the arm Q20 is at the zero line Q23 from which the position of the arm Q20 is measured as explained in the description of the linkage, the angles representing the deformation of the spring and the position of the arm Q20 are identical:

$$d = x \qquad (3)$$

Since the friction in the pivots of the linkage may be made practically nil, the law of conservation of energy requires that the torques of the arms Q20 and Q30 be inversely proportional to infinitesimal increments of their movements, that is to say, $$F_x \cdot dx = F_y \cdot dy \qquad (4)$$

where $F_x$ is the torque applied to the arm Q20 and $F_y$ is the torque applied to the arm Q30. Since the spring acts directly against the arm Q20.

$$F_x = F = K \cdot d = K \cdot x \qquad (5)$$

by Equations 2 and 3. Substituting in Equation 4 the value for $F_x$ given in Equation 5 and the value of $y$ given in Equation 1, we obtain $$K \cdot x \cdot dx = F_y \cdot d(Cx^2) \qquad (6)$$

$$K \cdot x \cdot dx = F_y \cdot C \cdot 2x \cdot dx \qquad (7)$$

$$F_y = \frac{K \cdot x \cdot dx}{2C \cdot x \cdot dx} = \frac{K}{2C} \qquad (8)$$

that is to say, the output torque $F_y$ is constant. It thus appears that the linkage exactly counterbalances the characteristic of the spring so as to produce a constant output torque. It is evident mathematically that this result occurs because the relation of the movements of the output and input elements of the linkage is $$y = C \int f(x) \, dx \qquad (9)$$

while the characteristic of the spring is $$F = f(d) \qquad (10)$$

and the spring is so attached to the linkage that $x$ and $d$ are equal.

If a spring whose force-deformation characteristic differs from that of the spring R be substituted for the spring R in the device described, it is possible to obtain a practically constant output torque from the device by making an adjustment in the position of the sector 13. In the case of any spring whose force is not exactly proportional to its extent of deformation from unstressed position, it has been found that a very close approximation to the actual forces produced by the spring over its working range can be obtained by considering such forces proportional to the extent of deformation of the spring measured from a slightly stressed condition of the spring. Over the working range of such a spring, the force-deformation characteristic may be expressed by the equation:

$$F = K \cdot (d+a) \qquad (11)$$

where $a$ is a small constant which may be either positive or negative. This formula gives a very close approximation to the forces produced by the spring over its working range.

When such a spring is used in the device which has been described, a constant output torque may be obtained on the quadratic arm Q30 by merely adjusting the sector 13 so as to place the unstressed position of the working end R2 of the spring on a line R3 at the angle $a$ from the zero line Q23. The extent of deformation $d$ is then measured from the line R3, but $x$ is measured from the zero line Q23 as before, so that $$x = d+a \qquad (12)$$

It is apparent that Equations 11 and 12 make $F_x$ equal to $K \cdot x$ as before, so that $F_y$ will be a constant.

Other types of springs may be substituted for the spiral spring R shown in Fig 1:

Fig. 2a shows a tension spring R' applied to a quadratic linkage like that shown in Fig. 1. The tension spring is anchored at one end to the frame Q10 and exerts a tension on a band R4 wound on and attached to a cylindrical drum Q25 which is fixed to the linear arm Q20 so that the spring applies a torque to this arm.

Fig. 2b shows a flat torsion spring R² arranged to apply a torque to the linear arm Q20 of the linkage. One end of the spring is attached to a short shaft Q11' on which the arm Q20 is fixed, while the other end of the spring is secured to a square shaft R5 which is held against rotation by engagement with a square hole in the frame Q10.

The modified devices shown in Figs. 2a and 2b operate in the manner which has been described in connection with the device shown in Fig. 1.

In the use of the spring device which has been described, the quadratic arm Q30 is connected to something to which a constant torque or force is to be applied while the frame or base Q10 is held stationary; or, if desired, the quadratic arm Q30 may be held stationary and the base Q10 used to apply the constant torque to a movable member.

The constant-torque spring device which has been described is useful for many purposes, a few of which will be mentioned for the sake of illustration.

The spring device may be used in a construction of an extremely effective device for eliminating vibration. Such a device is shown in Fig. 3.

Fig. 3 shows a spring device which, like that shown in Fig. 1, consists of a quadratic linkage Q and a spiral spring R. The base Q10' of the linkage is of a different form from that shown in Fig. 1 and the adjustable sector 13 is omitted. The linear and quadratic arms Q20, Q30 are shown at the middle of their ranges of movement, instead of near one end of their ranges as in Fig. 1.

An arm 60 is formed integral with the quadratic arm Q30 of the linkage and extends at such an angle to that arm as to be horizontal when the arm Q30 is at the middle of its range. At the end of the arm 60 is a cross-piece 61 whose outer surface lies on an arc whose center is at the pivot Q12. A massive member 70 is suspended from the arm 60 by a cord or band 71 attached to the upper end of the cross-piece 61 and lying against the arcuate face of this piece. The strength of the spring R is such that the constant torque which it applies to the arm Q30 is exactly equal to the torque applied to this arm in the opposite direction by the force of gravity on the member 70 acting through the arm 60. The mass or inertia of the member 70 is very much greater than the mass or inertia of the moving parts of the spring device including the linkage.

In the use of the device shown in Fig. 3, the base Q10' is mounted on a member 75 which is subjected to vertical vibration. Notwithstanding this vibration, it will be found that the member 70 remains practically stationary. This is because the system is in a state of perfect balance so that the forces caused by the vertical acceleration and deceleration of the base Q10' result in movements of the spring device and its linkage, whose inertia is slight, without causing appreciable movement of the member 70 whose inertia is large.

The device may be used as a seismograph in which case the member 75 is the earth and a scale or other means may be provided for observing oscillations of the arm Q20 or the arm Q30. The device may also be used to protect delicate instruments and the like from the vibration of machines or vehicles on which they are carried. In this case, the member 75 is part of the machine or vehicle, while the instrument is the member 70 suspended by the cord 71.

The device of Fig. 3 is in what is known as metastable equilibrium, that is to say, the spring and gravitational torques on the arm Q30 are exactly balanced in all positions of this arm within the working range, so that there is no tendency for the arm Q30 to return to any particular position within its range. This is a disadvantage for some purposes, for the device will cease to operate to eliminate vibration in case irregular shocks drive the arms to one end of their range.

Figs. 4 and 5 show modified devices for eliminating vibration in which stable equilibrium is obtained.

In Fig. 4, a coil spring 72 very much weaker than the spring R extends between the member 70 and a member 19 secured to the base Q10'. This spring is in unstressed condition when the arm 60 is horizontal and the arms Q20 and Q30 are at the middle of their ranges of movement. The spring 72 exerts a slight push or pull on the member 70 whenever the arms are displaced from the middles of their ranges, and thus produces a condition of stable equilibrium. The spring is, however, so weak that the forces which it applies to the member 70 on up and down vibration of the frame Q10 are not sufficient to cause appreciable vibration of the heavy member 70.

Fig. 5 shows a means for attaining stable equilibrium without the use of the spring 72. In this case, the spring device includes the adjusting sector 13 shown in Fig. 1, and the sector is adjusted by the handle 14 so as to displace the free position of the working end R2 of the spring R from the zero line Q23 of the linear arm Q20 of the linkage to a line R6 lying at a small angle $e$ to the zero line Q23 (see Fig. 1). This results in changing the torque applied to the arm Q20 from $K \cdot x$ to $K(x-e)$ and the value of the torque applied to the arm Q30 from the constant $F_y$ to the variable $$F_y\left(1-\frac{e}{x}\right)$$

which increases slightly with increase of $x$. This is indicated by the dotted line in the graph shown in Fig. 6 in which output torque is plotted against the angular movement $x$ of the arm Q20 and the working end of the spring. The spring torque on the arm Q30 may thus be made slightly greater than the gravitational torque from the weight 70 at the outer end of the working range and slightly less at the inner end of the range, so that a condition of stable equilibrium is obtained at an intermediate point where the spring torque is equal to the gravitational torque. Since the variation in the spring torque on the arm Q30 depends upon the size of the small angle $e$, it may be accurately adjusted by the handle 14 and sector 13 to be only sufficient to prevent the arms from reaching the ends of their ranges of movement during the operation of the vibration eliminating device.

The constant-torque spring device may be used as the spring suspension of a vehicle to prevent the rebound which occurs in ordinary spring suspensions. Such use of the device in an airplane landing gear is shown in Figs. 8a, 8b, 8c. The frame Q10² of the spring device is secured to the bottom of the body of the airplane and a stop 18 is provided on the frame to prevent the arm Q20 from moving beyond the inner end of the working range of the spring. The landing gear 80 carrying a wheel 81 is pivoted to the frame Q10² of the spring device at the point Q12 at which the quadratic arm Q30 is pivoted. The landing gear has an arm 82 connected to the arm Q30 through a shock absorber 83.

It will be seen that in the arrangement described the constant-force spring device and the variable-force spring of the shock absorber 83 are connected in series between the vehicle body and the wheel. The spring R of the constant-force spring device is of such strength that the constant force exerted by the device to urge the wheel away from the body is slightly greater than the normal static load on the wheel after the airplane is landed. The maximum force which can be exerted by the spring of the shock absorber is at least as great as the force exerted by the constant-force spring device. Consequently, when the wheel is urged towards the body, the approaching movement of the wheel toward the body is opposed by the increasing force of the spring of the shock absorber 83 until this spring has been deformed to a point where it exerts a force equal to the force of the constant-force spring device. Further approaching of the wheel then causes no further deformation of the spring of the shock absorber 83, but the constant-force spring device yields, opposing further approaching movement by a force slightly greater than the normal static load on the wheel over the complete range of movement of the constant-force spring device. A graph of the spring force opposing upward movement of the wheel is shown in Fig. 7. The effect of opposing upward movement of the wheel by a spring force of the character shown in Fig. 7 is to provide for absorbing the shock of landing in the usual manner and then to avoid upward movement or bouncing of the airplane if obstructions are encountered by the wheel. The operation is illustrated in Figs. 8a, 8b, 8c.

Fig. 8a shows the position of the parts just before the wheel 81 strikes the ground. The torsion spring R is at the inner end of its working range and is stressed sufficiently to hold the arm Q20 against the stop 18. The spring of the shock absorber is unstressed.

When the wheel strikes the ground, the shock absorber spring yields as shown in Fig. 8b, thus absorbing the shock of landing in the usual manner.

If the wheel 81 then strikes an obstruction as shown in Fig. 8c, further upward movement of the wheel toward the body is opposed only by the constant torque of the spiral spring on the arm Q30. The spring device, therefore, yields to permit the wheel to pass over the obstruction without increasing the down force on the wheel. Consequently, after the wheel is passed over the obstruction, it moves downwardly to the position shown in Fig. 8b under the constant torque of the spiral spring on the arm Q30 which, as shown in Fig. 7, slightly exceeds the static load on the wheel. Since no increased force is applied between the body and the wheel when the wheel is moved up by the obstruction, the body of the airplane is not moved upward to any appreciable extent and there is no bouncing.

As a safety measure to prevent the wheel from moving upwardly against the body in the case of a bad landing which places too large a load on the landing gear, the upward movement of the wheel is limited at the end of the working range of the spring device by contact between a stop 86 on the arm Q30 and a damped spring bumper 87 on an arm 88 extending from the frame Q10².

The constant-torque device may be used as the main spring of a timepiece. It is recognized that the rate of an accurate timepiece, such as a chronometer, is varied by a change in the torque applied to the clockwork by the main spring. To obtain accuracy, it has heretofore been necessary to use a very long main spring and to wind the spring frequently. With my spring device, greater accuracy can be obtained, as the torque remains constant throughout the working range of the spring. Furthermore, the use of a long spring to be rewound at frequent intervals is made unnecessary.

Figure 9A:
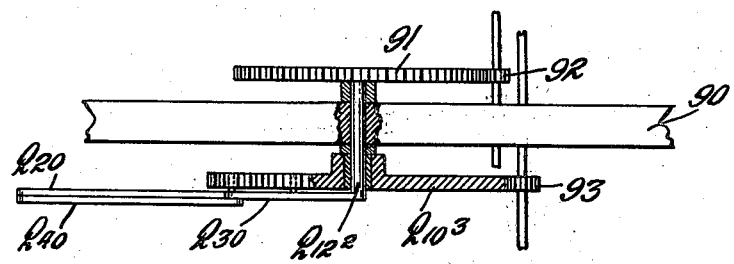
Figs. 9a and 9b show the spring device arranged for use as the main spring of a timepiece.
Figure 9B:
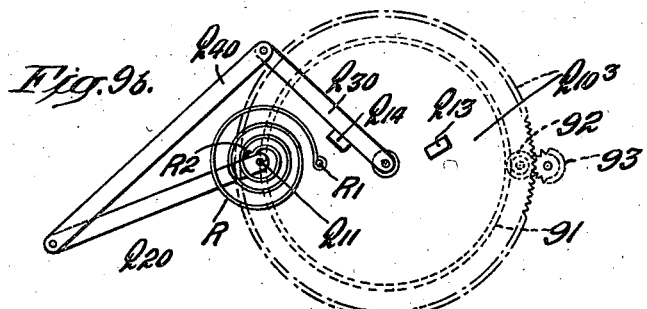

Figs. 9a and 9b show a constant-torque spring device like that shown in Fig. 1 arranged for use as a main spring in a timepiece. In this case the frame Q10³ of the quadratic linkage has the form of a gear rotatably mounted on a shaft Q12² in which the quadratic arm Q30 of the linkage is fixed. The remainder of the linkage and the spring R are arranged as before.

The shaft Q12² is journalled on the frame 90 of the clockwork and may carry a gear 91. Pinions 92, 93 on shafts journalled on the frame 90 engage the gears 91 and Q10³.

It will be seen that with this arrangement the constant torque which the spring through the linkage applies to the quadratic arm Q30 tends to rotate the gear 91 in one direction and the gear $Q10^3$ in the opposite direction. Thus either of the pinions 92 or 93 may be used to drive the clockwork while the other may be connected to the ordinary ratchet mechanism and used for winding the spring.

When the spring device is fully wound, the arm Q30 engages a stop Q13 on the gear $Q10^3$. The device will then exert a constant torque on the clockwork until the arm Q30 has moved into engagement with the stop Q14. The spring may be rewound at any time before this occurs and the operation of rewinding causes no change in the torque applied to the clockwork.

What I claim is:

1. A linkage mechanism consisting of a frame, two arms pivoted to the frame and a bar connecting the arms and pivoted to each of them in which the lengths of the arms and the bar measured between pivot points bear substantially the following critical relationships to the distance between the two pivot points on the frame:

Longer arm _____ 1.78
Shorter arm _____ 1.28
Connecting bar _____ 2.27 so that, when the longer arm is moved within a range extending between the positions in which it makes angles of 80° and 150° with its zero line at an angle of about 262° to the line connecting the pivots on the frame, the movement of the shorter arm measured from a fixed zero line closely approximates the square of the movement of the longer arm measured from its aforesaid zero line.

2. A spring device comprising the combination with a linkage as claimed in claim 1 of a spring having one of its ends attached to the frame of the linkage and its other end acting against the longer arm of the linkage and positioned so as to urge said arm towards its zero position and to be substantially free from deformation when said arm is in its zero position.

ANTONIN SVOBODA.